(12) United States Patent
Chang

(10) Patent No.: US 10,331,150 B2
(45) Date of Patent: Jun. 25, 2019

(54) POWER SUPPLY DEVICE AND CURRENT EQUALIZATION METHOD THEREOF

(71) Applicant: Shenzhen China Star Optoelectronics Semiconductor Display Technology Co., Ltd., Shenzhen (CN)

(72) Inventor: Bobiao Chang, Shenzhen (CN)

(73) Assignee: SHENZHEN CHINA STAR OPTOELECTRONICS SEMICONDUCTOR DISPLAY TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/742,040

(22) PCT Filed: Dec. 14, 2017

(86) PCT No.: PCT/CN2017/116269
§ 371 (c)(1),
(2) Date: Jan. 5, 2018

(87) PCT Pub. No.: WO2019/080303
PCT Pub. Date: May 2, 2019

(65) Prior Publication Data
US 2019/0121377 A1 Apr. 25, 2019

(30) Foreign Application Priority Data
Oct. 25, 2017 (CN) .......................... 2017 1 1010226

(51) Int. Cl.
*G05F 1/10* (2006.01)
*G05F 1/565* (2006.01)
(Continued)

(52) U.S. Cl.
CPC ................ *G05F 1/10* (2013.01); *G05F 1/565* (2013.01); *H02M 3/158* (2013.01); *G05F 1/575* (2013.01); *G05F 1/577* (2013.01)

(58) Field of Classification Search
CPC ... G05F 1/10; G05F 1/56; G05F 1/565; G05F 1/575; G05F 1/577
See application file for complete search history.

(56) References Cited

U.S. PATENT DOCUMENTS

2002/0044458 A1* 4/2002 Elbanhawy ............. H02J 1/102
363/15
2005/0093523 A1* 5/2005 Wu ...................... H02M 1/4208
323/222
(Continued)

FOREIGN PATENT DOCUMENTS

CN 101521454 A 9/2009
CN 102324852 A 1/2012
(Continued)

*Primary Examiner* — Jue Zhang
*Assistant Examiner* — David A. Singh
(74) *Attorney, Agent, or Firm* — Leong C. Lei

(57) ABSTRACT

A power supply device and current equalization method wherein the device includes: a plurality of power modules connected in parallel and a plurality of current equalization modules; two adjacent power modules corresponding to a current equalization module, each power module including: voltage output unit, power stage unit, and control unit; each current equalization module including: first and second current sampling conversion units, and error comparison unit; by using the error comparison unit to compare difference between load currents of two adjacent power modules and generating corresponding first control voltage based on the load currents, and the control unit generating the second control voltage based on the first control voltage to control the power stage unit to change the output voltage according to the second control voltage changing. The device accu- (Continued)

rately achieves current equalization of power modules connected in parallel and simplifies complexity of power supply device.

11 Claims, 2 Drawing Sheets

(51) Int. Cl.
 *H02M 3/158* (2006.01)
 *G05F 1/575* (2006.01)
 *G05F 1/577* (2006.01)

(56) References Cited

U.S. PATENT DOCUMENTS

| | | | | |
|---|---|---|---|---|
| 2009/0167080 | A1* | 7/2009 | Carpenter | H02M 3/1584 307/14 |
| 2010/0315049 | A1* | 12/2010 | Zafarana | H02M 3/1584 323/244 |
| 2015/0077073 | A1* | 3/2015 | Yu | H02M 3/1584 323/271 |
| 2015/0130426 | A1* | 5/2015 | Yang | H02M 3/157 323/234 |
| 2015/0180342 | A1* | 6/2015 | Yang | H02J 1/102 323/268 |
| 2016/0190940 | A1* | 6/2016 | Yan | H02M 3/285 363/17 |
| 2016/0259353 | A1* | 9/2016 | Morroni | H02M 3/285 |
| 2017/0099047 | A1* | 4/2017 | Hsiao | H03K 17/30 |

FOREIGN PATENT DOCUMENTS

| | | |
|---|---|---|
| CN | 103248231 A | 8/2013 |
| CN | 103346673 A | 10/2013 |
| CN | 104980024 A | 10/2015 |
| EP | 3091662 A1 | 11/2016 |

* cited by examiner

POWER SUPPLY DEVICE AND CURRENT EQUALIZATION METHOD THEREOF

BACKGROUND OF THE INVENTION

1. Field of the Invention

The present invention relates to the field of power supply techniques, and in particular to a power supply device and current equalization method thereof.

2. The Related Arts

With the continuous development of display technologies, the demand of the display device on the power supply device also increases. To enable the power supply device to provide more current and more power, the known technology proposes a distributed power supply device. The so-called distributed power supply device is to connect multiple power modules in parallel, provide the input voltage for the power modules connected in parallel, and then put the output voltages of multiple power modules together to provide to the load.

In the distributed power supply device, the impedance and the output electrical characteristics of each power module is different from one another, which results in different currents outputted by different power modules connected in parallel. A power module with lower impedance provides a larger current, while a power module with larger impedance will provide a smaller current. To be able to drive the load correctly and avoid equipment anomalies, the power output of each power module in the distributed power supply must be current equalized, that is, the current output of each voltage module must be equal.

The current equalization method of the conventional distributed power device includes the average current method and the output impedance method. The average current method mainly adjusts the voltage reference of each power module to achieve the current equalization by means of an average current bus feeding back the average current to each power module and the error of the self current of each power supply. The above method needs to dispose the average current bus in the system to feed back the average current of all the power modules, which is difficult to realize; and even if realized, the structure is often very complicated.

The output impedance method is, by adjusting the output voltage of each power module, to adjust the output current of each power module to achieve current equalization. When the load circuit is small, the distribution characteristics are poor. As the load current increases, the distribution will be improved but still not balanced. Generally, this method can only be used in low power or low accuracy of current equalization. For parallel modules with different rated power, the current equalization is difficult to achieve. Also, no communication exists between parallel power modules, which result in the load currents of the power modules varying greatly. The power module providing more current often restricts, due to the o over-current protection, the maximum output power of the power supply device.

SUMMARY OF THE INVENTION

The object of the present invention is to provide a power supply device, able to accurately achieve current equalization of each power module connected in parallel and simplify the complexity of the power supply device.

Another object of the present invention is to provide a method for current equalization, able to accurately achieve current equalization of each power module connected in parallel and simplify the complexity of the power supply device.

To achieve the above object, the present invention provides a power supply device, which comprises: a plurality of power modules connected in parallel and a plurality of current equalization modules;

except the last power module, two adjacent power modules corresponding to a current equalization module, each power module comprising: a voltage output unit, a power stage unit electrically connected to the voltage output unit, and a control unit electrically connected to the power stage unit; each current equalization module comprising: a first current sampling conversion unit electrically connected to the voltage output unit of one power module corresponding to the current equalization module, a second current sampling conversion unit electrically connected to the voltage output unit of the other power module corresponding to the current equalization module, and an error comparison unit electrically connected to both the first current sampling conversion unit and the second current sampling conversion unit;

the voltage output unit being for converting an input voltage received by the power module to an output voltage provided to a load;

the first current sampling conversion unit being for sampling a current flowing on a wire between the voltage output unit of the one power module corresponding to the current equalization module and the load, converting into a first sample voltage, and transferring to the error comparison unit;

the second current sampling conversion unit being for sampling a current flowing on a wire between the voltage output unit of the other power module corresponding to the current equalization module and the load, converting into a second sample voltage, and transferring to the error comparison unit;

the error comparison unit being for generating a first control voltage based on the first sample voltage and the second sample voltage, and inputting the first control voltage to the control unit of the one power module corresponding to the current equalization module; the first control voltage being equal to the second sample voltage minus the first sample voltage;

the control unit being for generating a second reference voltage based on the first control voltage and a default first reference voltage, and generating a second control voltage based on the second reference voltage and a feedback voltage obtained by dividing the output voltage based on a default ratio, and then outputting the second control voltage to the power stage unit; wherein, the second reference voltage being equal to the first control voltage plus the first reference voltage, and the second control voltage being equal to the second reference voltage minus the feedback voltage;

the power stage unit being for adjusting the voltage outputted by the voltage output unit based on the second control voltage.

According to a preferred embodiment of the present invention, the control unit comprises: an adder and a first error amplifier;

the adder having two input ends connected to the first reference voltage and the first control voltage; and an output end outputting the second reference voltage;

the first error amplifier having a positive input end connected to the second reference voltage, a negative input end connected to the feedback voltage, and an output end outputting the second control voltage to the power stage unit.

According to a preferred embodiment of the present invention, the error comparison unit comprises: a second error amplifier, the second error amplifier having a positive input end connected to the second sample voltage, a negative input end connected to the first sample voltage, and an output end outputting the first control voltage.

According to a preferred embodiment of the present invention, each current equalization module further comprises: a resistor, the resistor having two ends connected respectively to the first current sampling conversion unit and the second current sampling conversion unit.

According to a preferred embodiment of the present invention, the power stage unit controls the output voltage of the voltage output unit to change according to the second control voltage changing.

The present invention also provides a current equalization method for power supply device, which comprises:

Step S1: providing a power supply device; the power supply device comprising: a plurality of power modules connected in parallel and a plurality of current equalization modules;

except the last power module, two adjacent power modules corresponding to a current equalization module, each power module comprising: a voltage output unit, a power stage unit electrically connected to the voltage output unit, and a control unit electrically connected to the power stage unit; each current equalization module comprising: a first current sampling conversion unit electrically connected to the voltage output unit of one power module corresponding to the current equalization module, a second current sampling conversion unit electrically connected to the voltage output unit of the other power module corresponding to the current equalization module, and an error comparison unit electrically connected to both the first current sampling conversion unit and the second current sampling conversion unit;

Step S2: the power module receiving an input voltage, and the voltage output unit converting the input voltage received by the power module to an output voltage provided to a load;

Step S3: the first current sampling conversion unit sampling a current flowing on a wire between the voltage output unit of the one power module corresponding to the current equalization module and the load, converting into a first sample voltage, and transferring to the error comparison unit;

the second current sampling conversion unit sampling a current flowing on a wire between the voltage output unit of the other power module corresponding to the current equalization module and the load, converting into a second sample voltage, and transferring to the error comparison unit;

Step S4: the error comparison unit generating a first control voltage based on the first sample voltage and the second sample voltage, and inputting the first control voltage to the control unit of the one power module corresponding to the current equalization module; the first control voltage being equal to the second sample voltage minus the first sample voltage;

Step S5: the control unit generating a second reference voltage based on the first control voltage and a default first reference voltage, and generating a second control voltage based on the second reference voltage and a feedback voltage obtained by dividing the output voltage based on a default ratio, and then outputting the second control voltage to the power stage unit; wherein, the second reference voltage being equal to the first control voltage plus the first reference voltage, and the second control voltage being equal to the second reference voltage minus the feedback voltage;

Step S6: the power stage unit adjusting the voltage outputted by the voltage output unit based on the second control voltage.

According to a preferred embodiment of the present invention, the control unit comprises: an adder and a first error amplifier;

the adder having two input ends connected to the first reference voltage and the first control voltage; and an output end outputting the second reference voltage;

the first error amplifier having a positive input end connected to the second reference voltage, a negative input end connected to the feedback voltage, and an output end outputting the second control voltage to the power stage unit.

According to a preferred embodiment of the present invention, the error comparison unit comprises: a second error amplifier, the second error amplifier having a positive input end connected to the second sample voltage, a negative input end connected to the first sample voltage, and an output end outputting the first control voltage.

According to a preferred embodiment of the present invention, each current equalization module further comprises: a resistor, the resistor having two ends connected respectively to the first current sampling conversion unit and the second current sampling conversion unit.

According to a preferred embodiment of the present invention, the power stage unit controls the output voltage of the voltage output unit to change according to the second control voltage changing.

The present invention also provides a power supply device, which comprises: a plurality of power modules connected in parallel and a plurality of current equalization modules;

except the last power module, two adjacent power modules corresponding to a current equalization module, each power module comprising: a voltage output unit, a power stage unit electrically connected to the voltage output unit, and a control unit electrically connected to the power stage unit; each current equalization module comprising: a first current sampling conversion unit electrically connected to the voltage output unit of one power module corresponding to the current equalization module, a second current sampling conversion unit electrically connected to the voltage output unit of the other power module corresponding to the current equalization module, and an error comparison unit electrically connected to both the first current sampling conversion unit and the second current sampling conversion unit;

the voltage output unit being for converting an input voltage received by the power module to an output voltage provided to a load;

the first current sampling conversion unit being for sampling a current flowing on a wire between the voltage output unit of the one power module corresponding to the current equalization module and the load, converting into a first sample voltage, and transferring to the error comparison unit;

the second current sampling conversion unit being for sampling a current flowing on a wire between the voltage output unit of the other power module corresponding to the current equalization module and the load, converting into a second sample voltage, and transferring to the error comparison unit;

the error comparison unit being for generating a first control voltage based on the first sample voltage and the second sample voltage, and inputting the first control voltage to the control unit of the one power module corresponding to the current equalization module; the first control voltage being equal to the second sample voltage minus the first sample voltage;

the control unit being for generating a second reference voltage based on the first control voltage and a default first reference voltage, and generating a second control voltage based on the second reference voltage and a feedback voltage obtained by dividing the output voltage based on a default ratio, and then outputting the second control voltage to the power stage unit; wherein, the second reference voltage being equal to the first control voltage plus the first reference voltage, and the second control voltage being equal to the second reference voltage minus the feedback voltage;

the power stage unit being for adjusting the voltage outputted by the voltage output unit based on the second control voltage;

wherein the control unit comprising: an adder and a first error amplifier;

the adder having two input ends connected to the first reference voltage and the first control voltage; and an output end outputting the second reference voltage;

the first error amplifier having a positive input end connected to the second reference voltage, a negative input end connected to the feedback voltage, and an output end outputting the second control voltage to the power stage unit;

wherein the error comparison unit comprising: a second error amplifier, the second error amplifier having a positive input end connected to the second sample voltage, a negative input end connected to the first sample voltage, and an output end outputting the first control voltage;

wherein each current equalization module further comprising: a resistor, the resistor having two ends connected respectively to the first current sampling conversion unit and the second current sampling conversion unit;

wherein the power stage unit controlling the output voltage of the voltage output unit to change according to the second control voltage changing.

The present invention provides the following advantages: the invention provides a power supply device, comprising: a plurality of power modules connected in parallel and a plurality of current equalization modules; two adjacent power modules corresponding to a current equalization module, each power module comprising: a voltage output unit, a power stage unit electrically connected to the voltage output unit, and a control unit electrically connected to the power stage unit; each current equalization module comprising: a first current sampling conversion unit electrically connected to the voltage output unit of one power module corresponding to the current equalization module, a second current sampling conversion unit electrically connected to the voltage output unit of the other power module corresponding to the current equalization module, and an error comparison unit electrically connected to both the first current sampling conversion unit and the second current sampling conversion unit; by using the error comparison unit to compare the difference between the load currents of two adjacent power modules and generating the corresponding first control voltage based on the load currents of two adjacent power modules, and the control unit generating the second control voltage based on the first control voltage to control the power stage unit to change the output voltage of the voltage output unit according to the second control voltage changing. As such, the present invention can accurately achieve current equalization of power modules connected in parallel and simplify the complexity of the power supply device. The present invention also provides a current equalization method for power supply device, able to accurately achieve current equalization of power modules connected in parallel and simplify the complexity of the power supply device.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
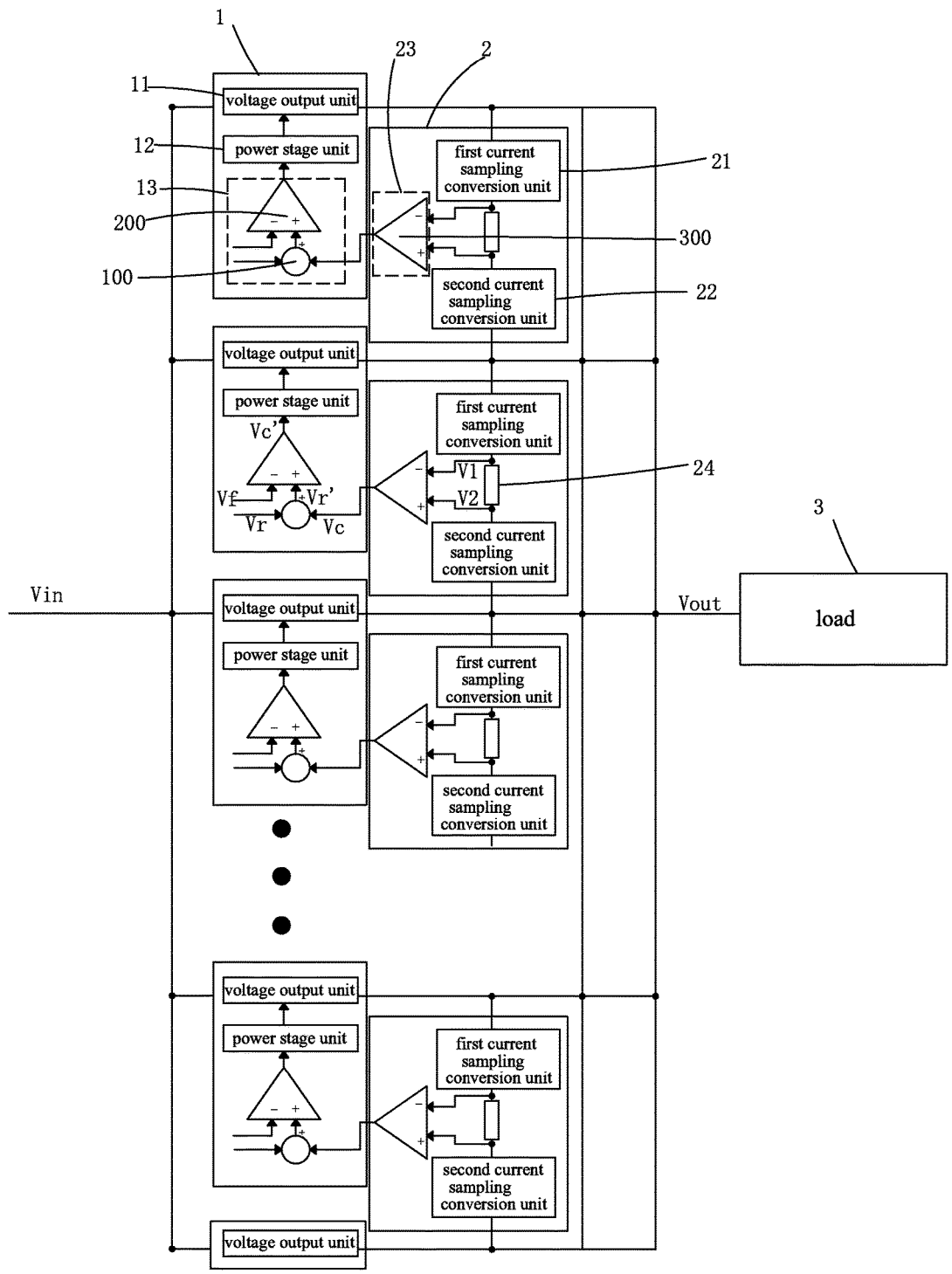
FIG. 1 is a schematic view showing a circuit diagram of the power supply device according to a preferred embodiment of the present invention.

Referring to FIG. 1, the present invention provides a power supply device, which comprises: a plurality of power modules 1 connected in parallel and a plurality of current equalization modules 2;

except the last power module 1, two adjacent power modules 1 correspond to a current equalization module 2, and each power module comprises: a voltage output unit 11, a power stage unit 12 electrically connected to the voltage output unit 11, and a control unit 13 electrically connected to the power stage unit 12; each current equalization module 2 comprises: a first current sampling conversion unit 21 electrically connected to the voltage output unit 11 of one power module 1 corresponding to the current equalization module 2, a second current sampling conversion unit 22 electrically connected to the voltage output unit 11 of the other power module 1 corresponding to the current equalization module 2, and an error comparison unit 23 electrically connected to both the first current sampling conversion unit 21 and the second current sampling conversion unit 22;

Specifically, the voltage output unit 11 is for converting an input voltage Vin received by the power module 1 to an output voltage Vout provided to a load 3.

Specifically, the first current sampling conversion unit 21 is for sampling a current flowing on a wire between the voltage output unit 11 of the one power module 1 corresponding to the current equalization module 2 and the load 3, converting into a first sample voltage V1, and transferring to the error comparison unit 23; the second current sampling conversion unit 22 is for sampling a current flowing on a wire between the voltage output unit 11 of the other power module 1 corresponding to the current equalization module 2 and the load 3, converting into a second sample voltage v2, and transferring to the error comparison unit 23.

It should be noted that, if the current sampled by the first sampling conversion unit 21 is larger than the current sampled by the second sampling conversion unit 22, the first sample voltage V1 converted from the first current sampling conversion unit 21 is still larger than the second voltage V2 converted from the second current sampling conversion unit 22; if the current sampled by the first sampling conversion unit 21 is equal to the current sampled by the second sampling conversion unit 22, the first sample voltage V1 converted from the first current sampling conversion unit 21 is still equal to the second voltage V2 converted from the second current sampling conversion unit 22; if the current sampled by the first sampling conversion unit 21 is smaller than the current sampled by the second sampling conversion unit 22, the first sample voltage V1 converted from the first current sampling conversion unit 21 is still smaller than the second voltage V2 converted from the second current sampling conversion unit 22.

Specifically, the error comparison unit 23 is for generating a first control voltage Vc based on the first sample voltage V1 and the second sample voltage V2, and inputting the first control voltage Vc to the control unit 13 of the one power module 1 corresponding to the current equalization module 2; the first control voltage Vc is equal to the second sample voltage V2 minus the first sample voltage V1.

Moreover, the error comparison unit 23 comprises: a second error amplifier 300, the second error amplifier 300 having a positive input end connected to the second sample voltage V2, a negative input end connected to the first sample voltage V1, and an output end outputting the first control voltage Vc. In addition, each current equalization module 2 further comprises: a resistor 24, the resistor 24 having two ends connected respectively to the first current sampling conversion unit 21 and the second current sampling conversion unit 22.

Specifically, the control unit 13 is for generating a second reference voltage Vr' based on the first control voltage Vc and a default first reference voltage Vr, and generating a second control voltage Vc' based on the second reference voltage Vr and a feedback voltage Vf obtained by dividing the output voltage Vout based on a default ratio, and then outputting the second control voltage Vc' to the power stage unit 12; wherein, the second reference voltage Vr' is equal to the first control voltage Vc plus the first reference voltage Vr, and the second control voltage Vc' is equal to the second reference voltage Vr' minus the feedback voltage Vf.

Moreover, the control unit 13 comprises: an adder 100 and a first error amplifier 200; the adder 100 having two input ends connected to the first reference voltage Vr and the first control voltage Vc, and an output end outputting the second reference voltage Vr'; the first error amplifier 200 having a positive input end connected to the second reference voltage Vr', a negative input end connected to the feedback voltage vf, and an output end outputting the second control voltage Vc' to the power stage unit 12.

Specifically, the power stage unit 12 is for adjusting voltage Vout outputted by the voltage output unit 11 based on the second control voltage Vc'.

Moreover, the power stage unit 12 controls the output voltage Vout of the voltage output unit 11 to change according to the second control voltage changing. In that words, the larger the second control voltage Vc' is, the larger the output voltage Vout will be; while the smaller the second control voltage Vc' is, the smaller the output voltage Vout will be.

It should be noted that using the current equalization of two adjacent power modules 1 as example, the operation of the present invention is described as follows: let the upper power module 1 in the two adjacent power modules 1 as the first power module, and the lower power module 1 in the two adjacent power modules 1 as the second power module. When the current outputted by the first power module to the load 3 is larger than the current outputted by the second power module to the load 3, the first sample voltage V1 is larger than the second sample voltage V2, the first control voltage Vc is equal to V2−V1, which is negative, the second reference voltage Vr' is equal to Vr+Vc, the second reference voltage Vr' is smaller than the first reference voltage Vr, the second control voltage Vc' is equal to Vr'−Vf, the second control voltage Vc' decreases, the both output voltage and current from the first power module decrease. Because the total current is fixed, when the current from the first power module decreases, the current from the second power module increases, until the current from the first power module and the current from the second power module are equal. When the current outputted by the first power module to the load 3 is larger than the current outputted by the second power module to the load 3, the first sample voltage V1 is larger than the second sample voltage V2, the first control voltage Vc is equal to V2−V1, which is negative, the second reference voltage Vr' is equal to Vr+Vc, the second reference voltage Vr' is smaller than the first reference voltage Vr, the second control voltage Vc' is equal to Vr'−Vf, the second control voltage Vc' decreases, the both output voltage and current from the first power module decrease. Because the total current is fixed, when the current from the first power module decreases, the current from the second power module increases, until the current from the first power module and the current from the second power module are equal. When the current outputted by the first power module to the load 3 is larger than the current outputted by the second power module to the load 3, the first sample voltage V1 is larger than the second sample voltage V2, the first control voltage Vc is equal to V2−V1, which is negative, the second reference voltage Vr' is equal to Vr+Vc, the second reference voltage Vr' is smaller than the first reference voltage Vr, the second control voltage Vc' is equal to Vr'−Vf, the second control voltage Vc' decreases, both the output voltage and current from the first power module decrease. Because the total current is fixed, when the current from the first power module decreases, the current from the second power module increases, until the current from the first power module and the current from the second power module are equal. When the current outputted by the first power module to the load 3 is smaller than the current outputted by the second power module to the load 3, the first sample voltage V1 is smaller than the second sample voltage V2, the first control voltage Vc is equal to V2−V1, which is positive, the second reference voltage Vr' is equal to Vr+Vc, the second reference voltage Vr' is larger than the first reference voltage Vr, the second control voltage Vc' is equal to Vr'−Vf, the second control voltage Vc' increases, both the output voltage and current from the first power module increase. Because the total current is fixed, when the current from the first power module increases, the current from the second power module decreases, until the current from the first power module and the current from the second power module are equal.

Accordingly, the present invention can, by using the error comparison unit 23 to compare the difference between the load currents of two adjacent power modules 1 and generating the corresponding first control voltage Vc based on the load currents of two adjacent power modules 1, and the control unit 13 generating the second control voltage Vc' based on the first control voltage Vc to control the power stage unit 12 to change the output voltage Vout of the voltage output unit 11 according to the second control voltage Vc' changing, accurately achieve current equalization of power modules connected in parallel and simplify the complexity of the power supply device.

Figure 2:
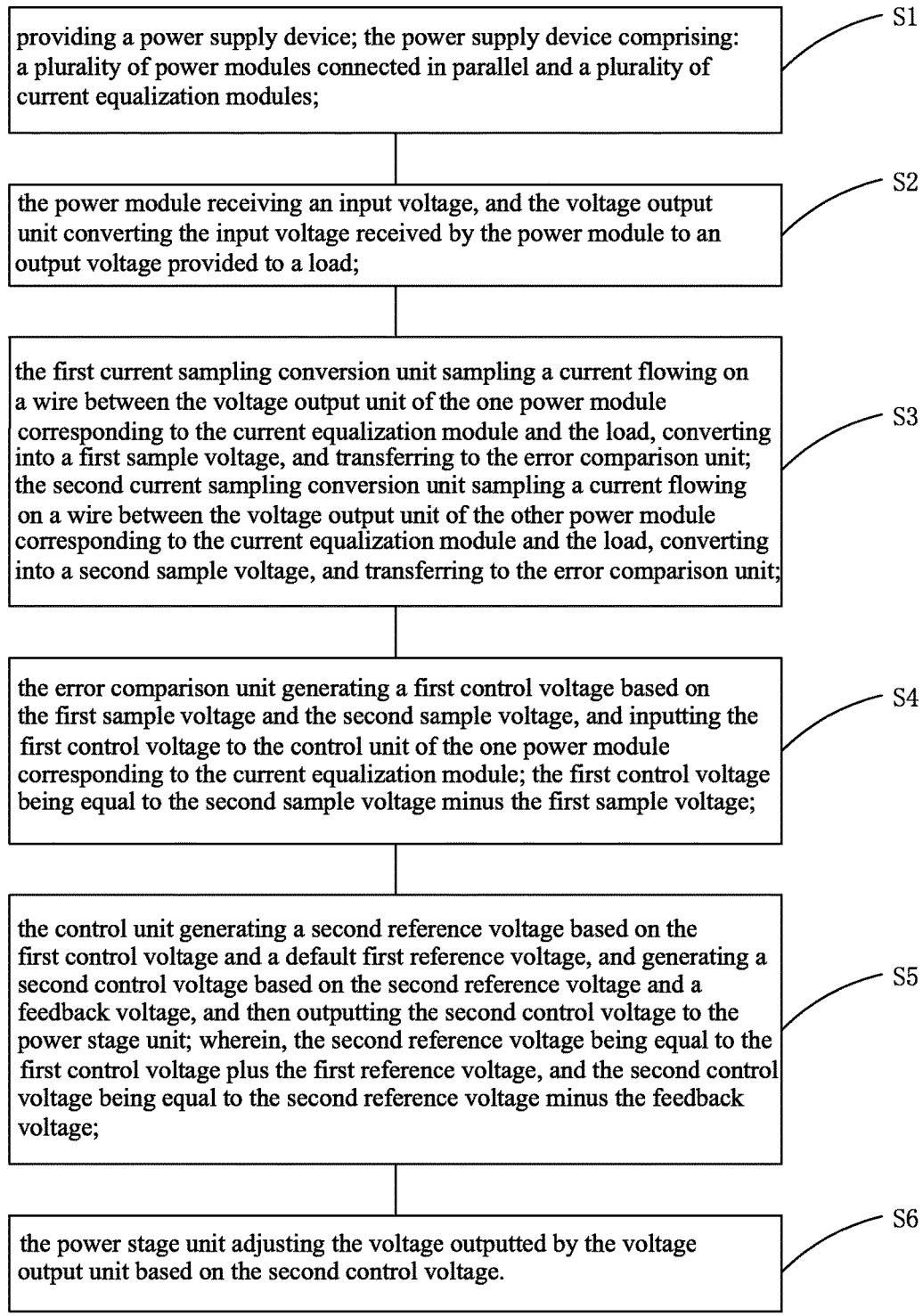
FIG. 2 is a schematic view showing a flowchart of the current equalization method for power supply device according to a preferred embodiment of the present invention.

Refer to FIG. 2. The present invention also provides a current equalization method for power supply device, which comprises the following steps:

Step S1: providing a power supply device; the power supply device comprising: a plurality of power modules 1 connected in parallel and a plurality of current equalization modules 2;

except the last power module 1, two adjacent power modules 1 corresponding to a current equalization module 2, each power module 1 comprising: a voltage output unit 11, a power stage unit 12 electrically connected to the voltage output unit 11, and a control unit 13 electrically connected to the power stage unit 12; each current equalization module 2 comprising: a first current sampling conversion unit 21 electrically connected to the voltage output unit 11 of one power module 1 corresponding to the current equalization module 2, a second current sampling conversion unit 22 electrically connected to the voltage output unit 11 of the other power module 1 corresponding to the current equalization module 2, and an error comparison unit 23 electrically connected to both the first current sampling conversion unit 21 and the second current sampling conversion unit 22.

Step S2: the power module 1 receiving an input voltage Vin, and the voltage output unit converting the input voltage Vin received by the power module 1 to an output voltage Vout provided to a load 3;

Step S3: the first current sampling conversion unit 21 sampling a current flowing on a wire between the voltage output unit 11 of the one power module 1 corresponding to the current equalization module 2 and the load 3, converting into a first sample voltage v1, and transferring to the error comparison unit 23;

the second current sampling conversion unit 22 sampling a current flowing on a wire between the voltage output unit 11 of the other power module 1 corresponding to the current equalization module 2 and the load 3, converting into a second sample voltage V2, and transferring to the error comparison unit 23.

Specifically, if the current sampled by the first sampling conversion unit 21 is larger than the current sampled by the second sampling conversion unit 22, the first sample voltage V1 converted from the first current sampling conversion unit 21 is still larger than the second voltage V2 converted from the second current sampling conversion unit 22; if the current sampled by the first current sampling conversion unit 21 is equal to the current sampled by the second sampling conversion unit 22, the first sample voltage V1 converted from the first current sampling conversion unit 21 is still equal to the second voltage V2 converted from the second current sampling conversion unit 22; if the current sampled by the first sampling conversion unit 21 is smaller than the current sampled by the second sampling conversion unit 22, the first sample voltage V1 converted from the first current sampling conversion unit 21 is still smaller than the second voltage V2 converted from the second current sampling conversion unit 22.

Step S4: the error comparison unit 23 generating a first control voltage Vc based on the first sample voltage V1 and the second sample voltage V2, and inputting the first control voltage Vc to the control unit 13 of the one power module 1 corresponding to the current equalization module 2; the first control voltage Vc being equal to the second sample voltage V2 minus the first sample voltage V1;

Specifically, the error comparison unit 23 comprises: a second error amplifier 300, the second error amplifier 300 having a positive input end connected to the second sample voltage V2, a negative input end connected to the first sample voltage V1, and an output end outputting the first control voltage Vc. In addition, each current equalization module 2 further comprises: a resistor 24, the resistor 24 having two ends connected respectively to the first current sampling conversion unit 21 and the second current sampling conversion unit 22.

Step S5: the control unit 13 generating a second reference voltage Vr' based on the first control voltage Vc and a default first reference voltage Vr, and generating a second control voltage Vc' based on the second reference voltage Vr' and a feedback voltage Vf obtained by dividing the output voltage Vout based on a default ratio, and then outputting the second control voltage Vc' to the power stage unit 12; wherein, the second reference voltage Vr' being equal to the first control voltage Vc plus the first reference voltage Vr, and the second control voltage Vc' being equal to the second reference voltage Vr' minus the feedback voltage Vf.

Specifically, the control unit 13 comprises: an adder 100 and a first error amplifier 200; the adder 100 having two input ends connected to the first reference voltage Vr and the first control voltage Vc, and an output end outputting the second reference voltage Vr'; the first error amplifier 200 having a positive input end connected to the second reference voltage Vr', a negative input end connected to the feedback voltage vf, and an output end outputting the second control voltage Vc' to the power stage unit 12.

Step S6: the power stage unit 12 adjusting the voltage Vout outputted by the voltage output unit 11 based on the second control voltage Vc'.

Specifically, the power stage unit 12 controls the output voltage Vout of the voltage output unit 11 to change according to the second control voltage changing. In that words, the larger the second control voltage Vc' is, the larger the output voltage Vout will be; while the smaller the second control voltage Vc' is, the smaller the output voltage Vout will be.

It should be noted that using the current equalization of two adjacent power modules 1 as example, the operation of the present invention is described as follows: let the upper power module 1 in the two adjacent power modules 1 as the first power module, and the lower power module 1 in the two adjacent power modules 1 as the second power module. When the current outputted by the first power module to the load 3 is larger than the current outputted by the second power module to the load 3, the first sample voltage V1 is larger than the second sample voltage V2, the first control voltage Vc is equal to V2−V1, which is negative, the second reference voltage Vr' is equal to Vr+Vc, the second reference voltage Vr' is smaller than the first reference voltage Vr, the second control voltage Vc' is equal to Vr'−Vf, the second control voltage Vc' decreases, the both output voltage and current from the first power module decrease. Because the total current is fixed, when the current from the first power module decreases, the current from the second power module increases, until the current from the first power module and the current from the second power module are equal. When the current outputted by the first power module to the load 3 is larger than the current outputted by the second power module to the load 3, the first sample voltage V1 is larger than the second sample voltage V2, the first control voltage Vc is equal to V2−V1, which is negative, the second reference voltage Vr' is equal to Vr+Vc, the second reference voltage Vr' is smaller than the first reference voltage Vr, the second control voltage Vc' is equal to Vr'−Vf, the second control voltage Vc' decreases, the both output voltage and current from the first power module decrease. Because the total current is fixed, when the current from the first power module decreases, the current from the second power module increases, until the current from the first power module and the current from the second power module are equal. When the current outputted by the first power module to the load 3 is larger than the current outputted by the second power module to the load 3, the first sample voltage V1 is larger than the second sample voltage V2, the first control voltage Vc is equal to V2−V1, which is negative, the second reference voltage Vr' is equal to Vr+Vc, the second reference voltage Vr' is smaller than the first reference voltage Vr, the second control voltage Vc' is equal to Vr'−Vf, the second control voltage Vc' decreases, both the output voltage and current from the first power module decrease. Because the total current is fixed, when the current from the first power module decreases, the current from the second power module increases, until the current from the first power module and the current from the second power module are equal. When the current outputted by the first power module to the load 3 is smaller than the current outputted by the second power module to the load 3, the first sample voltage V1 is smaller than the second sample voltage V2, the first control voltage Vc is equal to V2−V1, which is positive, the second reference voltage Vr' is equal to Vr+Vc, the second reference voltage Vr' is larger than the first reference voltage Vr, the second control voltage Vc' is equal to Vr'−Vf, the second control voltage Vc' increases, both the output voltage and current from the first power module increase. Because the total current is fixed, when the current from the first power module increases, the current from the second power module decreases, until the current from the first power module and the current from the second power module are equal.

In summary, the invention provides a power supply device, comprising: a plurality of power modules connected in parallel and a plurality of current equalization modules; two adjacent power modules corresponding to a current equalization module, each power module comprising: a voltage output unit, a power stage unit electrically connected to the voltage output unit, and a control unit electrically connected to the power stage unit; each current equalization module comprising: a first current sampling conversion unit electrically connected to the voltage output unit of one power module corresponding to the current equalization module, a second current sampling conversion unit electrically connected to the voltage output unit of the other power module corresponding to the current equalization module, and an error comparison unit electrically connected to both the first current sampling conversion unit and the second current sampling conversion unit; by using the error comparison unit to compare the difference between the load currents of two adjacent power modules and generating the corresponding first control voltage based on the load currents of two adjacent power modules, and the control unit generating the second control voltage based on the first control voltage to control the power stage unit to change the output voltage of the voltage output unit according to the second control voltage changing. As such, the present invention can accurately achieve current equalization of power modules connected in parallel and simplify the complexity of the power supply device. The present invention also provides a current equalization method for power supply device, able to accurately achieve current equalization of power modules connected in parallel and simplify the complexity of the power supply device.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A power supply device, comprising: a plurality of power modules connected in parallel and a plurality of current equalization modules;

except the last power module, two adjacent power modules correspond to a current equalization module; each power module comprising: a voltage output unit, a power stage unit electrically connected to the voltage output unit, and a control unit electrically connected to the power stage unit; each current equalization module comprising: a first current sampling conversion unit electrically connected to the voltage output unit of one power module corresponding to the current equalization module, a second current sampling conversion unit electrically connected to the voltage output unit of the other power module corresponding to the current equalization module, and an error comparison unit electrically connected to both the first current sampling conversion unit and the second current sampling conversion unit;

the voltage output unit being for converting an input voltage received by the power module to an output voltage provided to a load;

the first current sampling conversion unit being for sampling a current flowing on a wire between the voltage output unit of the one power module corresponding to the current equalization module and the load, converting the current into a first sample voltage, and transferring the first sample voltage to the error comparison unit;

the second current sampling conversion unit being for sampling a current flowing on a wire between the voltage output unit of the other power module corresponding to the current equalization module and the load, converting the current into a second sample voltage, and transferring the second sample voltage to the error comparison unit;

the error comparison unit being for generating a first control voltage based on the first sample voltage and the second sample voltage, and inputting the first control voltage to the control unit of the one power module corresponding to the current equalization module; the first control voltage being equal to the second sample voltage minus the first sample voltage;

the control unit being for generating a second reference voltage based on the first control voltage and a default first reference voltage, and generating a second control voltage based on the second reference voltage and a feedback voltage obtained by dividing the output voltage based on a default ratio, and then outputting the second control voltage to the power stage unit; wherein, the second reference voltage being equal to the first control voltage plus the first reference voltage, and the second control voltage being equal to the second reference voltage minus the feedback voltage;

the power stage unit being for adjusting a voltage outputted by the voltage output unit based on the second control voltage.

2. The power supply device as claimed in claim 1, wherein the control unit comprises: an adder and a first error amplifier;

the adder having two input ends connected to the first reference voltage and the first control voltage; and an output end outputting the second reference voltage;

the first error amplifier having a positive input end connected to the second reference voltage, a negative input end connected to the feedback voltage, and an output end outputting the second control voltage to the power stage unit.

3. The power supply device as claimed in claim 1, wherein the error comparison unit comprises: a second error amplifier, the second error amplifier having a positive input end connected to the second sample voltage, a negative input end connected to the first sample voltage, and an output end outputting the first control voltage.

4. The power supply device as claimed in claim 3, wherein each current equalization module further comprises: a resistor, the resistor having two ends connected respectively to the first current sampling conversion unit and the second current sampling conversion unit.

5. The power supply device as claimed in claim 1, wherein the power stage unit controls the output voltage of the voltage output unit to change according to the second control voltage changing.

6. A current equalization method for a power supply device, comprising the steps of:

Step S1: providing a power supply device; the power supply device comprising: a plurality of power modules connected in parallel and a plurality of current equalization modules;

except the last power module, two adjacent power modules correspond to a current equalization module; each power module comprising: a voltage output unit, a power stage unit electrically connected to the voltage output unit, and a control unit electrically connected to the power stage unit; each current equalization module comprising: a first current sampling conversion unit electrically connected to the voltage output unit of one power module corresponding to the current equalization module, a second current sampling conversion unit electrically connected to the voltage output unit of the other power module corresponding to the current equalization module, and an error comparison unit electrically connected to both the first current sampling conversion unit and the second current sampling conversion unit;

Step S2: the power module receiving an input voltage, and the voltage output unit converting the input voltage received by the power module to an output voltage provided to a load;

Step S3: the first current sampling conversion unit sampling a current flowing on a wire between the voltage output unit of the one power module corresponding to the current equalization module and the load, converting the current into a first sample voltage, and transferring the first sample voltage to the error comparison unit;

the second current sampling conversion unit sampling a current flowing on a wire between the voltage output unit of the other power module corresponding to the current equalization module and the load, converting the current into a second sample voltage, and transferring the second sample voltage to the error comparison unit;

Step S4: the error comparison unit generating a first control voltage based on the first sample voltage and the second sample voltage, and inputting the first control voltage to the control unit of the one power module corresponding to the current equalization module; the first control voltage being equal to the second sample voltage minus the first sample voltage;

Step S5: the control unit generating a second reference voltage based on the first control voltage and a default first reference voltage, and generating a second control voltage based on the second reference voltage and a feedback voltage obtained by dividing the output voltage based on a default ratio, and then outputting the second control voltage to the power stage unit; wherein, the second reference voltage being equal to the first control voltage plus the first reference voltage, and the second control voltage being equal to the second reference voltage minus the feedback voltage;

Step S6: the power stage unit adjusting a voltage outputted by the voltage output unit based on the second control voltage.

7. The current equalization method for power supply device as claimed in claim 6, wherein the control unit comprises: an adder and a first error amplifier;

the adder having two input ends connected to the first reference voltage and the first control voltage; and an output end outputting the second reference voltage;

the first error amplifier having a positive input end connected to the second reference voltage, a negative input end connected to the feedback voltage, and an output end outputting the second control voltage to the power stage unit.

8. The current equalization method for power supply device as claimed in claim 6, wherein the error comparison unit comprises: a second error amplifier, the second error amplifier having a positive input end connected to the second sample voltage, a negative input end connected to the first sample voltage, and an output end outputting the first control voltage.

9. The current equalization method for power supply device as claimed in claim 8, wherein each current equalization module further comprises: a resistor, the resistor having two ends connected respectively to the first current sampling conversion unit and the second current sampling conversion unit.

10. The current equalization method for power supply device as claimed in claim 6, wherein the power stage unit controls the output voltage of the voltage output unit to change according to the second control voltage changing.

11. A power supply device, comprising: a plurality of power modules connected in parallel and a plurality of current equalization modules;

except the last power module, two adjacent power modules correspond to a current equalization module; each power module comprising: a voltage output unit, a power stage unit electrically connected to the voltage output unit, and a control unit electrically connected to the power stage unit; each current equalization module comprising: a first current sampling conversion unit electrically connected to the voltage output unit of one power module corresponding to the current equalization module, a second current sampling conversion unit electrically connected to the voltage output unit of the other power module corresponding to the current equalization module, and an error comparison unit electrically connected to both the first current sampling conversion unit and the second current sampling conversion unit;

the voltage output unit being for converting an input voltage received by the power module to an output voltage provided to a load;

the first current sampling conversion unit being for sampling a current flowing on a wire between the voltage output unit of the one power module corresponding to the current equalization module and the load, converting the current into a first sample voltage, and transferring the first sample voltage to the error comparison unit;

the second current sampling conversion unit being for sampling a current flowing on a wire between the voltage output unit of the other power module corresponding to the current equalization module and the load, converting the current into a second sample voltage, and transferring the second sample voltage to the error comparison unit;

the error comparison unit being for generating a first control voltage based on the first sample voltage and the second sample voltage, and inputting the first control voltage to the control unit of the one power module corresponding to the current equalization module; the first control voltage being equal to the second sample voltage minus the first sample voltage;

the control unit being for generating a second reference voltage based on the first control voltage and a default first reference voltage, and generating a second control voltage based on the second reference voltage and a feedback voltage obtained by dividing the output voltage based on a default ratio, and then outputting the second control voltage to the power stage unit; wherein, the second reference voltage being equal to the first control voltage plus the first reference voltage, and the second control voltage being equal to the second reference voltage minus the feedback voltage;

the power stage unit being for adjusting a voltage outputted by the voltage output unit based on the second control voltage;

wherein the control unit comprising: an adder and a first error amplifier;

the adder having two input ends connected to the first reference voltage and the first control voltage; and an output end outputting the second reference voltage;

the first error amplifier having a positive input end connected to the second reference voltage, a negative input end connected to the feedback voltage, and an output end outputting the second control voltage to the power stage unit;

wherein the error comparison unit comprising: a second error amplifier, the second error amplifier having a positive input end connected to the second sample voltage, a negative input end connected to the first sample voltage, and an output end outputting the first control voltage;

wherein each current equalization module further comprising: a resistor, the resistor having two ends connected respectively to the first current sampling conversion unit and the second current sampling conversion unit;

wherein the power stage unit controlling the output voltage of the voltage output unit to change according to the second control voltage changing.

* * * * *